United States Patent
Park et al.

(10) Patent No.: US 11,305,755 B2
(45) Date of Patent: Apr. 19, 2022

(54) APPARATUS AND METHOD FOR REMOTELY CONTROLLING EXIT MODE IN VEHICLE

(71) Applicants: HYUNDAI MOTOR COMPANY, Seoul (KR); KIA MOTORS CORPORATION, Seoul (KR)

(72) Inventors: Jong Ho Park, Incheon (KR); Kyung Soo Ha, Hwaseong-si (KR); Gil Won Seo, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 301 days.

(21) Appl. No.: 16/598,266

(22) Filed: Oct. 10, 2019

(65) Prior Publication Data
US 2020/0391727 A1    Dec. 17, 2020

(30) Foreign Application Priority Data

Jun. 17, 2019   (KR) .................. 10-2019-0071693

(51) Int. Cl.
| | | |
|---|---|---|
| *B60W 30/06* | (2006.01) | |
| *G05D 1/00* | (2006.01) | |
| *B60R 25/24* | (2013.01) | |

(52) U.S. Cl.
CPC ............ *B60W 30/06* (2013.01); *B60R 25/24* (2013.01); *G05D 1/0011* (2013.01); *B60W 2554/00* (2020.02); *G05D 2201/0213* (2013.01)

(58) Field of Classification Search
CPC .......... G05D 1/0011; G05D 2201/0213; B60R 25/24; B60W 2554/00; B60W 30/06
See application file for complete search history.

(56) References Cited

U.S. PATENT DOCUMENTS

| | | | | |
|---|---|---|---|---|
| 2014/0308971 | A1* | 10/2014 | O'Brien | H04W 4/023 |
| | | | | 455/456.1 |
| 2017/0285634 | A1* | 10/2017 | Chin | B60R 25/00 |
| 2017/0361835 | A1* | 12/2017 | Tarte | G08G 1/147 |
| 2018/0187473 | A1* | 7/2018 | Norichika | B60R 25/31 |
| 2018/0328750 | A1* | 11/2018 | Yun | B62D 15/0285 |
| 2019/0094884 | A1* | 3/2019 | Aitken | G01C 21/00 |
| 2019/0220035 | A1* | 7/2019 | Wengreen | G05D 1/0231 |
| 2019/0292838 | A1* | 9/2019 | Tokudome | E05F 15/40 |
| 2020/0001862 | A1* | 1/2020 | Luo | G05D 1/0088 |
| 2020/0001863 | A1* | 1/2020 | Li | B60W 60/001 |
| 2020/0310407 | A1* | 10/2020 | Van Wiemeersch | |
| | | | | B60R 25/241 |

* cited by examiner

*Primary Examiner* — Peter D Nolan
*Assistant Examiner* — Demetra R Smith-Stewart
(74) *Attorney, Agent, or Firm* — Slater Matsil, LLP (57) ABSTRACT

An apparatus for remotely controlling an exit mode in a vehicle includes a driver detector that detects a location of a driver, an obstacle detector that detects an obstacle located around the vehicle, and a controller that sets an exit mode of a remotely started vehicle based on the location of the driver, detected by the driver detector, and the location of the obstacle, detected by the obstacle detector.

12 Claims, 7 Drawing Sheets

APPARATUS AND METHOD FOR REMOTELY CONTROLLING EXIT MODE IN VEHICLE

CROSS-REFERENCE TO RELATED APPLICATION

This application is claims the benefit of priority to Korean Patent Application No. 10-2019-0071693, filed in the Korean Intellectual Property Office on Jun. 17, 2019, the entire contents of which are incorporated herein by reference.

TECHNICAL FIELD

The present disclosure relates to technologies of remotely controlling an exit mode in a vehicle.

BACKGROUND

A remote smart parking assist system is a parking convenience system that reduces a driver's burden when parking the vehicle or exiting from a parking spot by parking or maneuvering the vehicle using remote control with the driver standing outside of the vehicle. The system uses sensors to identify an available parking spot and park the vehicle while avoiding nearby obstacles by controlling the steering, acceleration, deceleration and gear-changing functions. The driver can choose from parallel parking, reverse right-angle parking, and forward right-angle parking. The system also uses the sensors to exit a parking spot while avoiding nearby obstacles by controlling the steering, acceleration, deceleration and gear-changing functions.

The disclosure of this section is to provide background of the invention. Applicant notes that this section may contain information available before this application. However, by providing this section, Applicant does not admit that any information contained in this section constitutes prior art.

SUMMARY

An aspect of the present disclosure provides an apparatus and method for remotely controlling an exit mode in a vehicle to set the exit mode of the vehicle based on a location of the driver and information about an obstacle around the vehicle when the vehicle remotely starts to take the vehicle out irrespective of a state (perpendicular parking or parallel parking) when the vehicle is parked.

According to an aspect of the present disclosure, an apparatus may include: a driver detector that detects a location of a driver, an obstacle detector that detects an obstacle located around the vehicle, and a controller that sets an exit mode of a remotely started vehicle based on the location of the driver, the location being detected by the driver detector, and the location of the obstacle, the location being detected by the obstacle detector.

The driver detector may detect a smart key the driver carries.

The driver detector may include a low frequency (LF) antenna that is located on a front of the vehicle and communicates with the smart key of the driver, an LF antenna that is located on a right side of the vehicle and communicates with the smart key of the driver, an LF antenna that is located on a rear of the vehicle and communicates with the smart key of the driver, an LF antenna that is located on a left side of the vehicle and communicates with the smart key of the driver, and a determiner that determines the location of the driver based on detection information obtained via each of the LF antennas. The detection information may include received intensity of a signal received from the smart key of the driver.

The determiner may classify a detection region of the driver as a front long distance, a front right side, the right, a rear right side, a rear long distance, a rear left side, the left, a front left side, a front short distance, or a rear short distance of the vehicle.

The obstacle detector may detect at least one or more of a distance from the obstacle, a location of the obstacle, or a size of the obstacle.

According to another aspect of the present disclosure, a method may include: detecting, by a driver detector, a location of a driver, detecting, by an obstacle detector, an obstacle located around the vehicle, and setting, by a controller, an exit mode of a remotely started vehicle based on the detected location of the driver and the detected location of the obstacle.

The detecting of the location of the driver may include detecting a smart key the driver carries.

The detecting of the location of the driver may include communicating, by an LF antenna located on a front of the vehicle, with the smart key of the driver, communicating, by an LF antenna located on a right side of the vehicle, with the smart key of the driver, communicating, by an LF antenna located on a rear of the vehicle, with the smart key of the driver, communicating, by an LF antenna located on a left side of the vehicle, with the smart key of the driver, and determining, by a determiner, the location of the driver based on detection information obtained via each of the LF antennas. The detection information may include received intensity of a signal received from the smart key of the driver.

The determining of the location of the driver may include determining any one of a front long distance, a front right side, the right, a rear right side, a rear long distance, a rear left side, the left, a front left side, a front short distance, or a rear short distance of the vehicle as the location of the driver.

The detecting of the obstacle may include detecting at least one or more of a distance from the obstacle, a location of the obstacle, or a size of the obstacle.

According to another aspect of the present disclosure, an apparatus may include: a storage storing parking state history information of the vehicle and a controller that sets an exit mode of a remotely started vehicle based on the parking state history information stored in the storage.

The controller may set a mode where the vehicle travels perpendicularly forward and exits to a left direction of a parking space, when the vehicle enters from a right direction of the parking space and is parked perpendicularly in reverse. The controller may set a mode where the vehicle travels perpendicularly forward and exits to the right direction of the parking space, when the vehicle enters from the left direction of the parking space and is parked perpendicularly in reverse.

The controller may set a mode where the vehicle travels perpendicularly in reverse and exits to a right direction of a parking space, when the vehicle enters from the right direction of the parking space and is parked perpendicularly forward. The controller may set a mode where the vehicle travels perpendicularly in reverse and exits to a left direction of the parking space, when the vehicle enters from the left direction of the parking space and is parked perpendicularly forward.

The controller may set a mode where the vehicle travels diagonally in reverse and exits to the right, when the vehicle enters from a right direction of a parking space and is parked diagonally forward. The controller may set a mode where the vehicle travels diagonally in reverse and exits to the left, when the vehicle enters from a left direction of the parking space and is parked diagonally forward.

The controller may set a mode where the vehicle travels diagonally forward and exits to the right, when the vehicle enters from a right direction of a parking space and is parked diagonally in reverse. The controller may set a mode where the vehicle travels diagonally forward and exits to the left, when the vehicle enters from a left direction of the parking space and is parked diagonally in reverse.

The controller may set a left exit mode in the vehicle, when the vehicle enters from a right direction of a parking space and is parallel parked. The controller may set a right exit mode in the vehicle, when the vehicle enters from a left direction of the parking space and is parallel parked.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In implementations of a remote smart parking system loaded into a vehicle, the system may set an entry mode of the vehicle in consideration of a transmission stage, a type of starting, a driving history of 5 kph or more, and a parking history as shown in Table 1 below.

TABLE 1

| Trans-mission stage | Starting | Driving history of 5 kph or more | Parking history | Entry mode |
|---|---|---|---|---|
| D | General Starting | Don't care | Don't care | Parking |
| N | General Starting | ○ | Don't care | |
| | General Starting | x | Don't care | Exit |
| | General Starting | Don't care | Parallel Parking | |
| P | General Starting | x | Don't care | |
| | General Starting | Don't care | Parallel Parking | |
| | General Starting | ○ | Don't care | Drive straight |
| P | Remote Starting | Don't care | Don't care | |

1) When the transmission stage is the driving (D) stage and when the starting is the general starting, and when a driver presses down on a button of a smart key, the vehicle may enter a parking mode. In this case, the general starting may refer to starting using a start button in the vehicle. It does not matter whether the button of the smart key is any of two buttons (a forward button and a reverse button) assigned for parking.

2) When the transmission stage is the neutral (N) stage and when the starting is the general starting, and when there is the driving history of 5 kph or more just before, the vehicle may enter the parking mode when the driver presses down on the button of the smart key.

3) When the transmission stage is the N stage and when the starting is the general starting, and when there is no driving history of 5 kph or more just before, the vehicle may enter the exit mode when the driver presses down on the button of the smart key. In this case, the exit mode may refer to smart exit of controlling all of a change of speed, steering, a vehicle speed, and the like.

4) When the transmission stage is the N stage and when the starting is the general starting, and when the vehicle is parallel parked, the vehicle may enter the exit mode when the driver presses down on the button of the smart key.

5) When the transmission stage is the parking (P) stage and when the starting is the general starting, and when there is no driving history of 5 kph or more just before, the vehicle may enter the exit mode when the driver presses down on the key of the smart key.

6) When the transmission stage is the P stage and when the starting is the general starting, and when the vehicle is parallel parked, the vehicle may enter the exit mode when the driver presses down on the button of the smart key.

7) When the transmission stage is the P stage and when the starting is the general starting, and when there is a driving history of 5 kph or more just before, the vehicle may enter the drive-straight mode when the driver presses down on the key of the smart key. In this case, the drive-straight mode may include a forward mode and a reverse mode of the vehicle. When the driver presses down on a forward button, the vehicle may enter a forward mode. When the driver presses down on a reverse button, the vehicle may enter a reverse mode.

8) When the transmission stage is the P stage and when the starting is the remote starting, the vehicle may enter the drive-straight mode when the driver presses down on the key of the smart key. In this case, the remote starting may refer to starting using the smart key.

As described above, for the remote starting, the remote smart parking system loaded into the vehicle provides only the drive-straight mode and fails to provide the exit mode.

Thus, when the vehicle is parked perpendicularly, the driver may move the vehicle from a parking space in the drive-straight mode to conveniently ride in the vehicle. However, when the vehicle is parallel parked, because it is unable for the driver to move the vehicle from the parking space in the drive-straight mode, this results in an inconvenience to riding of the driver. Particularly, when a wall is located at the driver's seat of a parallel parking space, because the driver should move to the driver's seat through a passenger seat, inconvenience becomes more and more increased.

Figure 1:
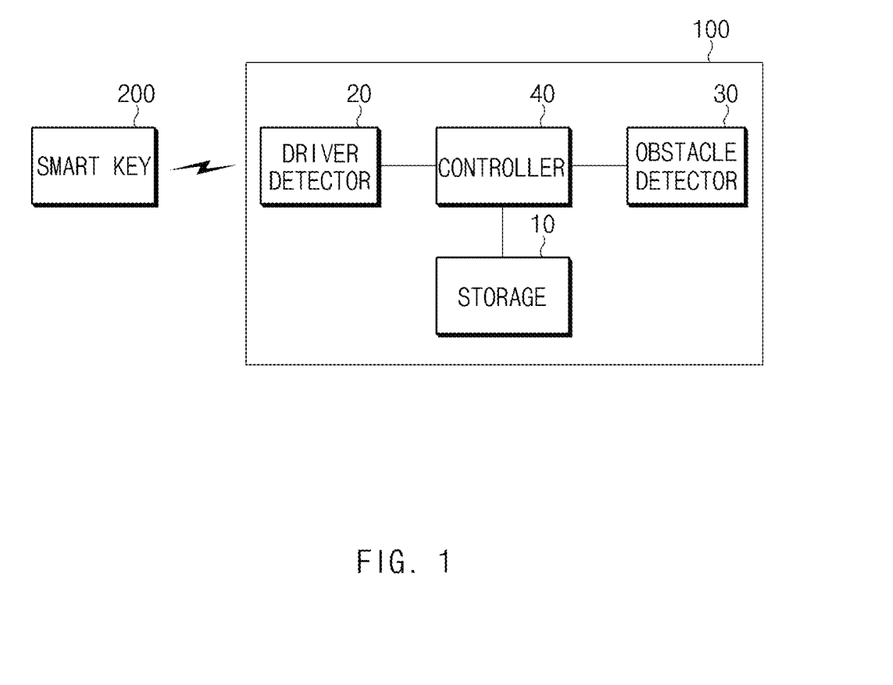
FIG. 1 is a block diagram illustrating a configuration of an apparatus for remotely controlling an exit mode in a vehicle according to an embodiment of the present disclosure.

FIG. 1 is a block diagram illustrating a configuration of an apparatus for remotely controlling an exit mode in a vehicle according to an embodiment of the present disclosure.

As shown in FIG. 1, an apparatus 100 for remotely controlling an exit mode in a vehicle according to an embodiment of the present disclosure may include a storage 10, a driver detector 20, an obstacle detector 30, and a controller 40. In this case, the respective components may be combined with each other to form one component and some components may be omitted, depending on a manner which executes the apparatus 100 for remotely controlling an exit mode in a vehicle according to an embodiment of the present disclosure.

Seeing the respective components, first of all, the storage 10 may store various logics, algorithms, and programs, which are required in a process of setting an exit mode of the vehicle based on a location of a driver and information about an obstacle around the vehicle when the vehicle remotely starts.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The driver detector 20 may detect a location of the driver around the vehicle. In embodiments, the driver detector 20 may detect a smart key 200 the driver carries.

The obstacle detector 30 may detect an obstacle located around the vehicle.

The controller 40 may perform overall control such that the respective components normally perform their own functions. Such a controller 40 may be implemented in the form of hardware or software or in the form of a combination thereof. In one embodiment, the controller 40 may be implemented as, but not limited to, a microprocessor.

Particularly, the controller 40 may perform a variety of control required in a process of setting an exit mode of the vehicle based on a location of the driver and information about an obstacle around the vehicle when the vehicle remotely starts.

The controller 40 may set an exit mode of a remotely started vehicle based on the location of the driver, detected by the driver detector 20, and the location of the obstacle, detected by the obstacle detector 30, depending on an exit request from the smart key 200. In this case, the exit request signal should continue being received during the exit of the vehicle. In embodiments, the driver should continue pressing down on a button of the smart key 200 to continue the exit process of the vehicle.

Herein, the exit mode may include right side exit, left side exit, remote reverse, and remote forward. For example, the right side exit and the left side exit are applicable to when the vehicle is parked perpendicularly, and the remote reverse and the remote forward are applicable to when the vehicle is parallel parked. However, embodiments are not limited thereto.

In embodiments, the driver detector 20, the obstacle detector 30 and the controller 40 may be implemented in one processor or multiple processors. In one embodiment, each of the driver detector 20, the obstacle detector 30 and the controller 40 may be implemented in one of multiple processors.

Figure 2A:
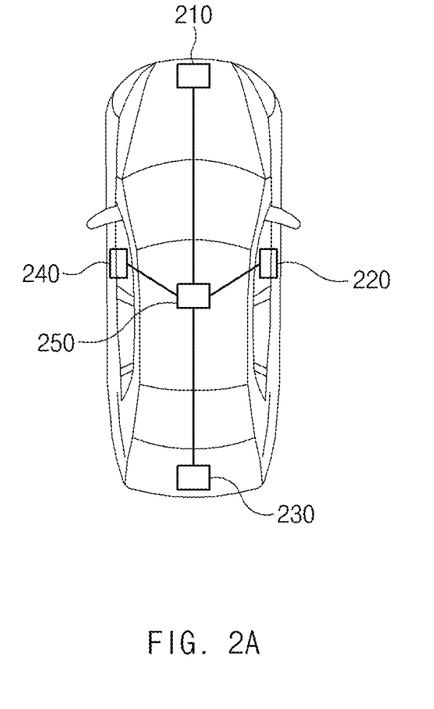
FIG. 2A is a drawing illustrating a configuration of a driver detector included in an apparatus for remotely controlling an exit mode in a vehicle according to an embodiment of the present disclosure.

FIG. 2A is a drawing illustrating a configuration of a driver detector included in an apparatus for remotely controlling an exit mode in a vehicle according to an embodiment of the present disclosure.

As shown in FIG. 2A, a driver detector 20 included in an apparatus 100 for remotely controlling an exit mode in a vehicle according to an embodiment of the present disclosure may include a front low frequency (LF) antenna which is located on a front of the vehicle to communicates with a smart key of a driver, a right side LF antenna 220 which is located on a right side of the vehicle to communicate with the smart key of the driver, a rear LF antenna 230 which is located on a rear of the vehicle to communicate with the smart key of the driver, a left side LF antenna 240 which is located on a left side of the vehicle to communicate with the smart key of the driver, and a determiner 250 which determines a location of the driver based on detection information from each of the LF antennas 210 to 240.

Herein, the detection information may include information indicating whether the smart key is scanned and received intensity of a signal from the smart key when the smart key is scanned. Furthermore, the function of the determiner 240 may be implemented to be performed by the controller 40.

Figure 2B:
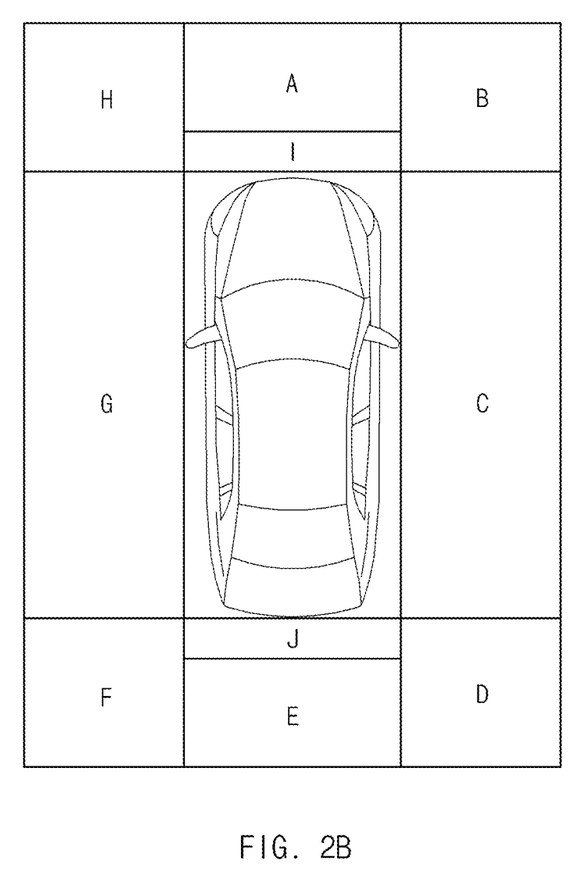
FIG. 2B is a drawing illustrating a detection region of a driver detector included in an apparatus for remotely controlling an exit mode in a vehicle according to an embodiment of the present disclosure.

FIG. 2B is a drawing illustrating a detection region of a driver detector included in an apparatus for remotely controlling an exit mode in a vehicle according to an embodiment of the present disclosure.

As shown in FIG. 2B, in embodiments, a detection region of a driver detector 20 included in an apparatus 100 for remotely controlling an exit mode in a vehicle according to an embodiment of the present disclosure may be classified as, for example, a front long distance A, a front right side B, the right C, a rear right side D, a rear long distance E, a rear left side F, the left G, a front left side H, a front short distance I, or a rear short distance J.

A relationship between detection information from each of LF antennas 210 to 240 of FIG. 2A and the detection region is shown in Table 2 below.

TABLE 2

| Front LF antenna | Right side LF antenna | Rear LF antenna | Left side LF antenna | Location of driver |
|---|---|---|---|---|
| o | x | x | x | A |
| o | o | x | x | B |
| x | o | x | x | C |
| x | o | o | x | D |
| x | x | o | x | E |
| x | x | o | o | F |
| x | x | x | o | G |
| o | x | x | o | H |
| x | x | x | x | Non-detection |

A determiner 250 of FIG. 2A may determine a location of the driver, as shown in Table 2 above, depending on whether each of the LF antennas 210 to 240 detects a driver (exactly when each of the LF antennas 210 to 240 detects a smart key of the driver). Particularly, when a front LF antenna 210 of FIG. 2A detects the driver, the determiner 250 may further determine whether the driver is located in the front long distance A or the front short distance I. Furthermore, when a rear LF antenna 230 of FIG. 2A detects the driver, the determiner 250 may further determine whether the driver is located in the rear long distance E or the rear short distance J.

Figure 3:
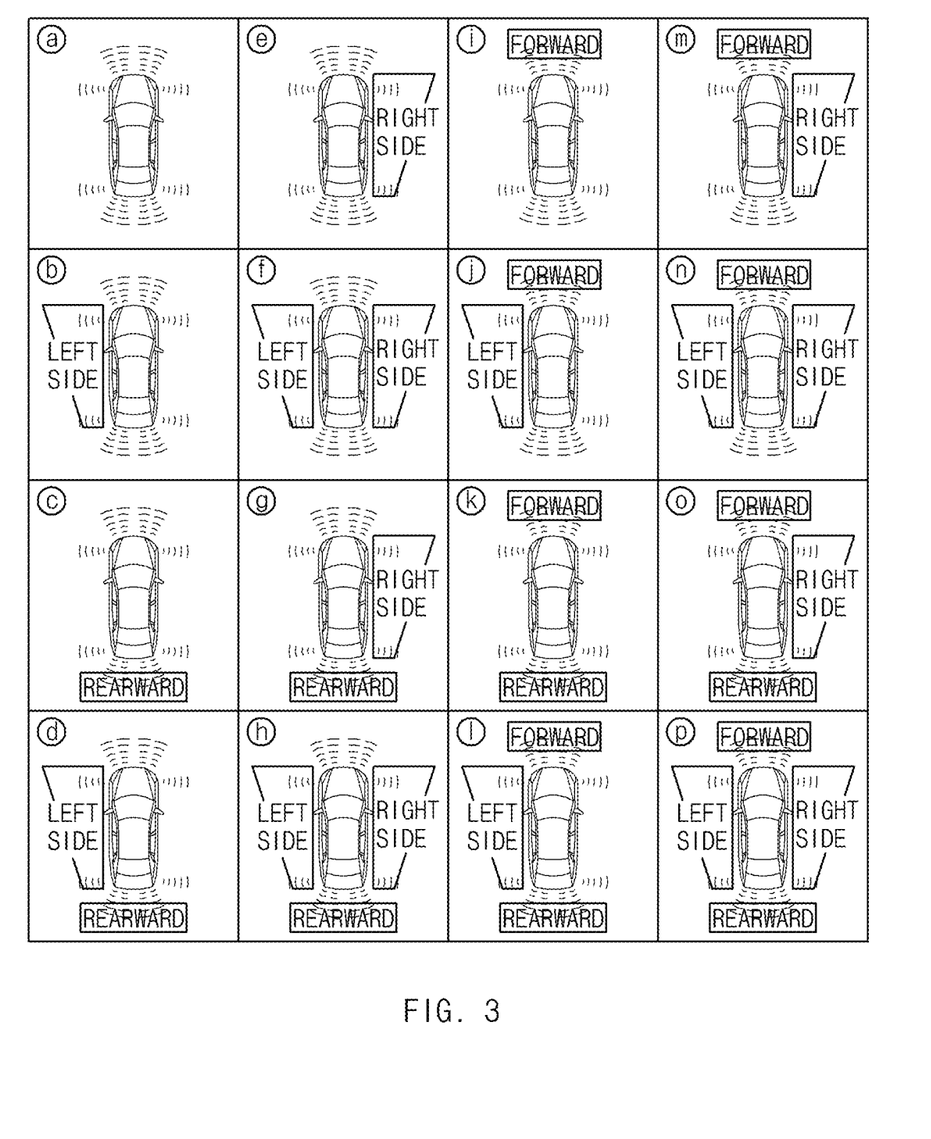
FIG. 3 is a drawing illustrating a location of an obstacle detected by an obstacle detector included in an apparatus for remotely controlling an exit mode in a vehicle according to an embodiment of the present disclosure.

FIG. 3 is a drawing illustrating a location of an obstacle detected by an obstacle detector included in an apparatus for remotely controlling an exit mode in a vehicle according to an embodiment of the present disclosure.

As shown in FIG. 3, an obstacle detector 30 included in an apparatus 100 for remotely controlling an exit mode in a vehicle according to an embodiment of the present disclosure may include sensors respectively provided at a front, a right side, a rear, and a left side of the vehicle. In this case, the sensors may include an ultrasonic sensor, a camera, a laser sensor, a radar sensor, a light detection and ranging (LiDAR) sensor, and the like.

A relationship between detection information from each of the sensors and a location of an obstacle is shown in Table 3 below. Herein, the detection information may include information indicating whether the obstacle is detected, a distance from the obstacle, a location of the obstacle, a size of the obstacle, or the like.

TABLE 3

| Forward sensor | Right sensor | Rearward sensor | Left sensor | Location of obstacle |
|---|---|---|---|---|
| x | x | x | x | (a) |
| x | x | x | o | (b) |
| x | x | o | x | (c) |
| x | x | o | o | (d) |
| x | o | x | x | (e) |
| x | o | x | o | (f) |
| x | o | o | x | (g) |
| x | o | o | o | (h) |
| o | x | x | x | (i) |
| o | x | x | o | (j) |
| o | x | o | x | (k) |
| o | x | o | o | (l) |
| o | o | x | x | (m) |
| o | o | x | o | (n) |
| o | o | o | x | (o) |
| o | o | o | o | (p) |

In Table 3 above, (a) indicates the state where all of the forward sensor, the right sensor, the rearward sensor, and the left sensor do not sense the obstacle, and (p) indicates the state where all of the forward sensor, the right sensor, the rearward sensor, and the left sensor sense the obstacle. For example, when the vehicle is parallel parked, in (k), the forward sensor may sense another vehicle parked in front of the vehicle and the rearward sensor may sense another vehicle parked behind the vehicle. When the vehicle is parked perpendicularly, in (f), the right sensor may sense another vehicle parked on the right of the vehicle and the left sensor may sense another vehicle parked on the left of the vehicle.

Hereinafter, a description will be given in detail of a process where a controller 40 of FIG. 1 sets an exit mode of a remotely started vehicle based on a location of a driver, detected by a driver detector 20 of FIG. 1, and a location of an obstacle, detected by an obstacle detector 30 of FIG. 1, using an example of FIG. 2B and an example of FIG. 3.

In Tables 4 and 5 below, reference denotation RHD refers to the right exit, reference denotation LHD refers to the left exit, reference denotation FD refers to the remote forward, reference denotation RD refers to the remote reverse, and reference denotation x refers to the case where it is impossible to set the mode.

Herein, for reference denotation FD/RD, when the driver presses down on a forward button of a smart key, the controller 40 may set a current mode to a remote forward mode. When the driver presses down on a reverse button of the smart key, the controller 40 may set the current mode to a remote reverse mode.

Furthermore, for reference denotation LDH/RHD, the controller 40 may set the current mode to any one of a right exit mode or a left exit mode irrespective of a button of the smart key. In this case, it is safe to set the current mode to any mode because both of the right exit mode and the left exit mode are possible.

Furthermore, the reason why it is possible for the controller 40 to set the current mode to the right exit mode although there is the driver at a front right side is because the driver is sufficiently spaced from a right exit path.

TABLE 4

|   | A | I | B | C | D |
|---|---|---|---|---|---|
| (a) | FD/RD | RD | FD/RD | LHD | FD/RD |
| (b) | RHD | RHD | RHD | FD/RD | RHD |
| (c) | FD | LHD/RHD | RHD | LHD | RHD |
| (d) | RHD | RHD | RHD | FD | RHD |
| (e) | LHD | LHD | FD | LHD | RD |
| (f) | RD | RD | FD | FD/RD | RD |
| (g) | LHD | LHD | FD | LHD | LHD |
| (h) | x | x | FD | FD | FD |
| (i) | FD/RD | RD | RHD | LHD | RHD |
| (j) | RHD | RHD | RHD | RD | RHD |
| (k) | FD | LHD/RHD | RHD | LHD | RHD |
| (l) | RHD | RHD | RHD | x | RHD |
| (m) | LHD | LHD | LHD | LHD | RD |
| (n) | RD | RD | RD | RD | RD |
| (o) | LHD | LHD | LHD | LHD | LHD |
| (p) | FD | x | x | x | x |

TABLE 5

|   | E | J | F | G | H |
|---|---|---|---|---|---|
| (a) | FD/RD | FD | FD/RD | RHD | FD/RD |
| (b) | RHD | RHD | RD | RHD | FD |

TABLE 5-continued

| | E | J | F | G | H |
|---|---|---|---|---|---|
| (c) | FD | FD | LHD | RHD | LHD |
| (d) | RHD | RHD | RHD | RHD | FD |
| (e) | LHD | LHD | LHD | FD/RD | LHD |
| (f) | FD | FD | RD | FD/RD | FD |
| (g) | LHD | LHD | LHD | FD | LHD |
| (h) | FD | FD | RD | FD | FD |
| (i) | RD | LHD/RHD | LHD | RHD | LHD |
| (j) | RHD | RHD | RD | RD | RHD |
| (k) | RD | LHD/RHD | LHD | RHD | LHD |
| (l) | RHD | RHD | RHD | RHD | RHD |
| (m) | LHD | LHD | LHD | RD | LHD |
| (n) | x | x | RD | RD | RHD |
| (o) | LHD | LHD | LHD | x | LHD |
| (p) | RD | x | x | x | x |

Meanwhile, the controller 40 may set an exit mode of the vehicle based on parking state history information stored in a storage 10 of FIG. 1.

Hereinafter, a description will be given in detail of a method where the controller 40 sets the exit mode of the vehicle based on the parking state history information stored in the storage 10 with reference to FIG. 4.

Figure 4:
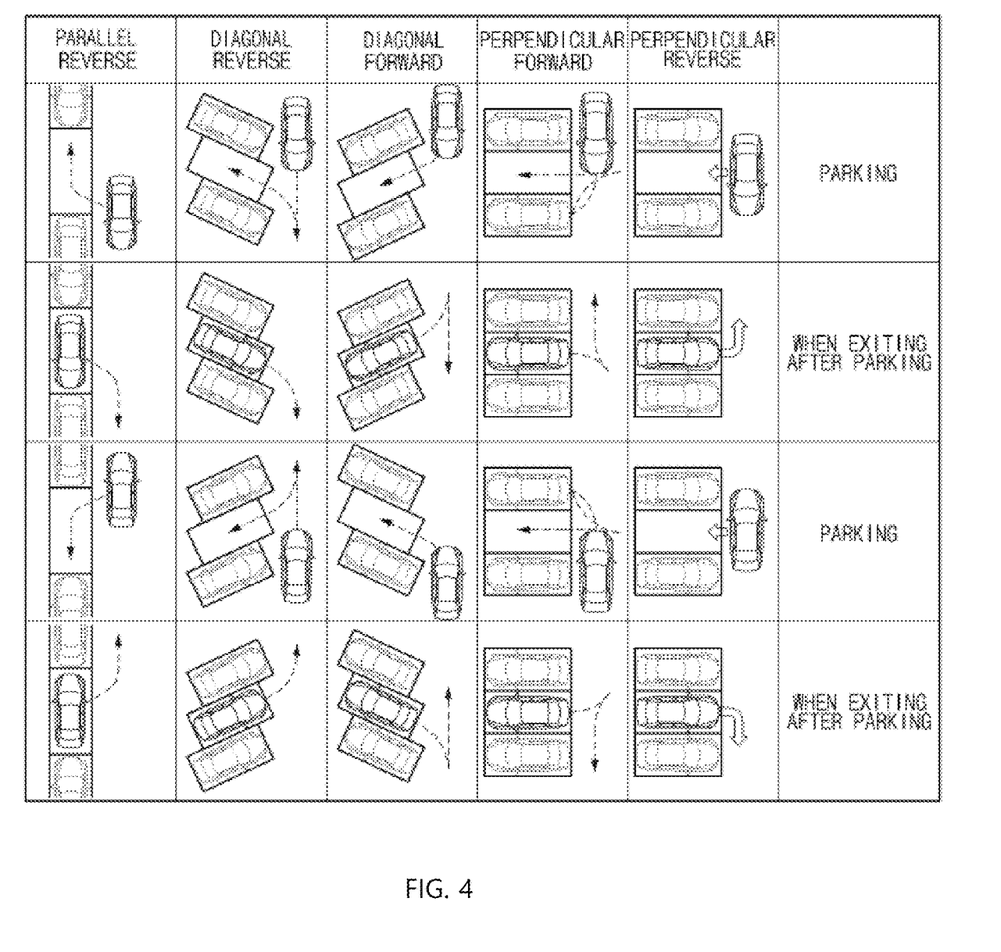
FIG. 4 is a drawing illustrating a manner in which an apparatus for remotely controlling an exit mode in a vehicle sets the exit mode of the vehicle according to another embodiment of the present disclosure.

FIG. 4 is a drawing illustrating a manner in which an apparatus for remotely controlling an exit mode in a vehicle sets the exit mode of the vehicle according to another embodiment of the present disclosure.

1) When the vehicle enters from a right direction of a parking space and is parked perpendicularly in reverse, a controller 40 of FIG. 1 may set a mode where the vehicle travels perpendicularly forward and exits to a left direction of the parking space.

2) When the vehicle enters from the left direction of the parking space and is parked perpendicularly in reverse, the controller 40 may set a mode where the vehicle travels perpendicularly forward and exits to the right direction of the parking space.

3) When the vehicle enters from the right direction of the parking space and is parked perpendicularly forward, the controller 40 may set a mode where the vehicle travels perpendicularly in reverse and exits to the right direction of the parking space.

4) When the vehicle enters from the left direction of the parking space and is parked perpendicularly forward, the controller 40 may set a mode where the vehicle travels perpendicularly in reverse and exits to the left direction of the parking space.

5) When the vehicle enters from the right direction of the parking space and is parked diagonally forward, the controller 40 may set a mode where the vehicle travels diagonally in reverse and exits to the right.

6) When the vehicle enters from the left direction of the parking space and is parked diagonally forward, the controller 40 may set a mode where the vehicle travels diagonally in reverse and exits to the left.

7) When the vehicle enters from the right direction of the parking space and is parked diagonally in reverse, the controller 40 may set a mode where the vehicle travels diagonally forward and exits to the right.

8) When the vehicle enters from the left direction of the parking space and is parked diagonally in reverse, the controller 40 may set a mode where the vehicle travels diagonally forward and exits to the left.

9) When the vehicle enters from the right direction of the parking space and is parallel parked, the controller 40 may set a left exit mode in the vehicle.

10) When the vehicle enters from the left direction of the parking space and is parallel parked, the controller 40 may set a right exit mode in the vehicle.

For each of the above-mentioned cases, the exit mode set by the controller 40 is shown in Table 6 below.

TABLE 6

| Parking state | | Exit mode |
|---|---|---|
| Perpendicular reverse | Enter from the right | Travel perpendicularly forward and exit to the left |
| | Enter from the left | Travel perpendicularly forward and exit to the right |
| Perpendicular forward | Enter from the right | Travel perpendicularly in reverse and exit to the right |
| | Enter from the left | Travel perpendicularly in reverse and exit to the left |
| Diagonal forward | Enter from the right | Travel diagonally in reverse and exit to the right |
| | Enter from the left | Travel diagonally in reverse and exit to the left |
| Diagonal reverse | Enter from the right | Travel diagonally forward and exit to the right |
| | Enter from the left | Travel diagonally forward and exit to the left |
| Parallel | Enter from the right | Travel parallel and exit to the left |
| | Enter from the left | Travel parallel and exit to the right |

Figure 5:
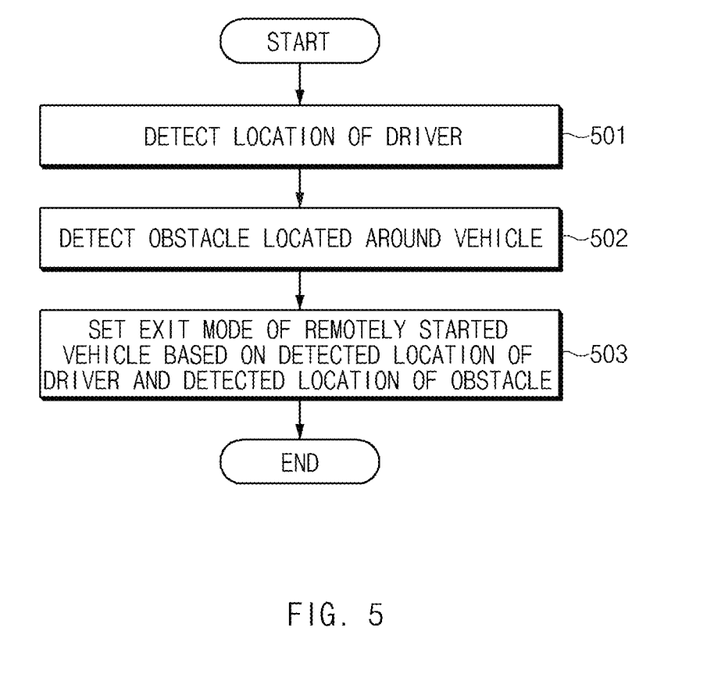
FIG. 5 is a flowchart illustrating a method for remotely controlling an exit mode in a vehicle according to an embodiment of the present disclosure.

FIG. 5 is a flowchart illustrating a method for remotely controlling an exit mode in a vehicle according to an embodiment of the present disclosure.

First of all, in operation 501, a driver detector 20 of FIG. 1 may detect a location of a driver.

In operation 502, an obstacle detector 30 of FIG. 1 may detect an obstacle located around the vehicle.

In operation 503, the controller 40 may set an exit mode of a remotely started vehicle based on the location of the driver, detected by the driver detector 20, and the location of the obstacle, detected by the obstacle detector 30.

Figure 6:
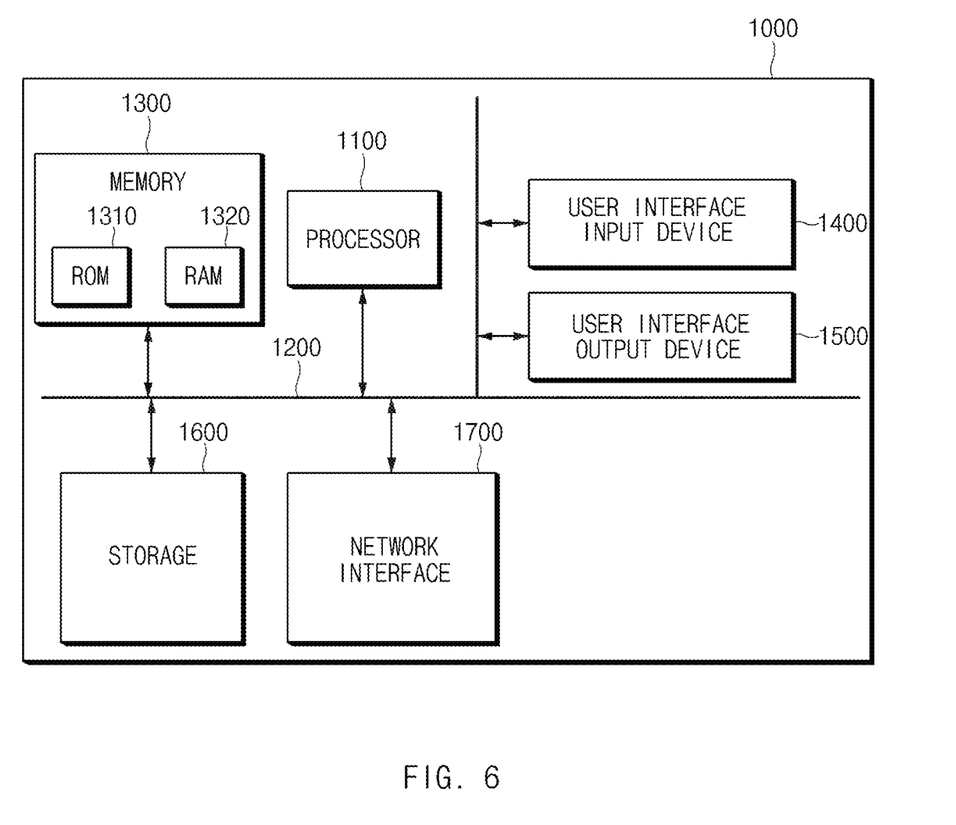
FIG. 6 is a block diagram illustrating a computing system for executing a method for remotely controlling an exit mode in a vehicle according to an embodiment of the present disclosure.

FIG. 6 is a block diagram illustrating a computing system for executing a method for remotely controlling an exit mode in a vehicle according to an embodiment of the present disclosure.

Referring to FIG. 6, the method for remotely controlling an exit mode in the vehicle according to an embodiment of the present disclosure may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600) such as a RAM memory, a flash memory, a ROM memory, an EPROM memory, an EEPROM memory, a register, a hard disk, a removable disk, a CD-ROM. One example of the storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for remotely controlling the exit mode in the vehicle may set the exit mode of the vehicle based on a location of the driver and information about an obstacle around the vehicle when the vehicle remotely starts to take the vehicle out irrespective of a state (perpendicular parking or parallel parking) when the vehicle is parked.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for remotely controlling an exit mode in a vehicle, the apparatus comprising:
    a storage configured to store parking state history information of the vehicle; and
    a controller configured to:
        set the exit mode of a remotely started vehicle based on the parking state history information stored in the storage;
        set a mode where the vehicle travels perpendicularly forward and exits to a left direction of a parking space, when the vehicle enters from a right direction of the parking space and is parked perpendicularly in reverse; and
        set a mode where the vehicle travels perpendicularly forward and exits to the right direction of the parking space, when the vehicle enters from the left direction of the parking space and is parked perpendicularly in reverse.

2. The apparatus of claim 1,
wherein the controller is configured to set a mode where the vehicle travels perpendicularly in reverse and exits to the right direction of the parking space, when the vehicle enters from the right direction of the parking space and is parked perpendicularly forward, and
wherein the controller is configured to set a mode where the vehicle travels perpendicularly in reverse and exits to the left direction of the parking space, when the vehicle enters from the left direction of the parking space and is parked perpendicularly forward.

3. The apparatus of claim 1,
wherein the controller is configured to set a mode where the vehicle travels diagonally in reverse and exits to the right, when the vehicle enters from the right direction of the parking space and is parked diagonally forward,
wherein the controller is configured to set a mode where the vehicle travels diagonally in reverse and exits to the left, when the vehicle enters from the left direction of the parking space and is parked diagonally forward.

4. The apparatus of claim 1,
wherein the controller is configured to set a mode where the vehicle travels diagonally forward and exits to the right, when the vehicle enters from the right direction of the parking space and is parked diagonally in reverse, and
wherein the controller is configured to set a mode where the vehicle travels diagonally forward and exits to the left, when the vehicle enters from the left direction of the parking space and is parked diagonally in reverse.

5. The apparatus of claim 1,
wherein the controller is configured to set a left exit mode in the vehicle, when the vehicle enters from the right direction of the parking space and is parallel parked, and
wherein the controller is configured to set a right exit mode in the vehicle, when the vehicle enters from the left direction of the parking space and is parallel parked.

6. An apparatus for remotely controlling an exit mode in a vehicle, the apparatus comprising:
    a storage configured to store parking state history information of the vehicle; and
    a controller configured to:
        set the exit mode of a remotely started vehicle based on the parking state history information stored in the storage;
        set a mode where the vehicle travels perpendicularly in reverse and exits to a right direction of a parking space, when the vehicle enters from the right direction of the parking space and is parked perpendicularly forward; and
        set a mode where the vehicle travels perpendicularly in reverse and exits to a left direction of the parking space, when the vehicle enters from the left direction of the parking space and is parked perpendicularly forward.

7. The apparatus of claim 6,
wherein the controller is configured to set a mode where the vehicle travels diagonally in reverse and exits to the right, when the vehicle enters from the right direction of the parking space and is parked diagonally forward,
wherein the controller is configured to set a mode where the vehicle travels diagonally in reverse and exits to the left, when the vehicle enters from the left direction of the parking space and is parked diagonally forward.

8. The apparatus of claim 6,
wherein the controller is configured to set a mode where the vehicle travels diagonally forward and exits to the right, when the vehicle enters from the right direction of the parking space and is parked diagonally in reverse, and wherein the controller is configured to set a mode where the vehicle travels diagonally forward and exits to the left, when the vehicle enters from the left direction of the parking space and is parked diagonally in reverse.

9. The apparatus of claim 6, wherein the controller is configured to set a left exit mode in the vehicle, when the vehicle enters from the right direction of the parking space and is parallel parked, and wherein the controller is configured to set a right exit mode in the vehicle, when the vehicle enters from the left direction of the parking space and is parallel parked.

10. An apparatus for remotely controlling an exit mode in a vehicle, the apparatus comprising:

a storage configured to store parking state history information of the vehicle; and a controller configured to:

set the exit mode of a remotely started vehicle based on the parking state history information stored in the storage;

set a left exit mode in the vehicle, when the vehicle enters from a right direction of a parking space and is parallel parked; and set a right exit mode in the vehicle, when the vehicle enters from a left direction of the parking space and is parallel parked.

11. The apparatus of claim 10, wherein the controller is configured to set a mode where the vehicle travels diagonally in reverse and exits to the right, when the vehicle enters from the right direction of the parking space and is parked diagonally forward, wherein the controller is configured to set a mode where the vehicle travels diagonally in reverse and exits to the left, when the vehicle enters from the left direction of the parking space and is parked diagonally forward.

12. The apparatus of claim 10, wherein the controller is configured to set a mode where the vehicle travels diagonally forward and exits to the right, when the vehicle enters from the right direction of the parking space and is parked diagonally in reverse, and wherein the controller is configured to set a mode where the vehicle travels diagonally forward and exits to the left, when the vehicle enters from the left direction of the parking space and is parked diagonally in reverse.

* * * * *